United States Patent
Hsiao et al.

(10) Patent No.: US 7,443,618 B2
(45) Date of Patent: Oct. 28, 2008

(54) MOTOR STRUCTURE WITH BUILT-IN LENS

(75) Inventors: Cheng-Fang Hsiao, Guangdong (CN);
Wun-Chang Shih, Guangdong (CN);
Ching-Hsing Huang, Guangdong (CN);
Chien-Long Hong, Guangdong (CN);
Hsien-Sheng Pei, Guangdong (CN)

(73) Assignee: Foxconn Technology Co., Ltd.,
Tu-Cheng, Taipei Hsien (TW)

( * ) Notice: Subject to any disclaimer, the term of this patent is extended or adjusted under 35 U.S.C. 154(b) by 109 days.

(21) Appl. No.: 11/308,964

(22) Filed: May 30, 2006

(65) Prior Publication Data

US 2007/0053073 A1 Mar. 8, 2007

(30) Foreign Application Priority Data

Sep. 2, 2005 (CN) .......................... 2005 1 0037026

(51) Int. Cl.
*G02B 7/02* (2006.01)
*G02B 15/14* (2006.01)
*G03B 17/00* (2006.01)

(52) U.S. Cl. ...................... 359/819; 359/822; 359/823; 359/694; 359/696; 396/85

(58) Field of Classification Search ................ 359/696, 359/808, 811, 813, 814, 819, 829, 830
See application file for complete search history.

(56) References Cited

U.S. PATENT DOCUMENTS

| | | | | |
|---|---|---|---|---|
| 4,844,586 A | * | 7/1989 | Suzuki et al. | 359/824 |
| 6,163,412 A | * | 12/2000 | Onda | 359/696 |
| 7,262,927 B1 | * | 8/2007 | Shyu et al. | 359/823 |
| 2004/0080836 A1 | * | 4/2004 | Miyashita et al. | 359/805 |
| 2004/0165877 A1 | * | 8/2004 | Hsiao | 396/85 |
| 2004/0247306 A1 | * | 12/2004 | Jeong et al. | 396/85 |

FOREIGN PATENT DOCUMENTS

| | | |
|---|---|---|
| CN | 2677958 Y | 2/2005 |
| JP | 7-306455 | 11/1955 |
| JP | 6-230264 | 8/1994 |
| JP | 8-114739 | 5/1996 |
| TW | 556851 | 10/2003 |

* cited by examiner

*Primary Examiner*—Ricky Mack
*Assistant Examiner*—Mahidere S Sahle
(74) *Attorney, Agent, or Firm*—Winston Hsu

(57) ABSTRACT

A motor structure with a built-in lens includes a lens mount (10), a motor (30) received in the lens mount, and a lens unit (50) received in the lens mount. The lens unit is drove by the motor to telescopically move along an axial thereof when a rotor (34) of the motor is rotated. A guiding member (70) arranged on an end of the motor for preventing an axial movement of the motor. The guiding member includes at least a leg (78) extending along an axial direction therefrom for guiding the axial movement of the lens unit.

15 Claims, 4 Drawing Sheets

MOTOR STRUCTURE WITH BUILT-IN LENS

FIELD OF THE INVENTION

The present invention relates generally to drive source of camera lens, and more particularly to a drive source with built-in camera lens.

DESCRIPTION OF RELATED ART

The traditional structure of camera lens affixes a drive motor on an outside of a camera lens mount and, through the connection of transmission parts, the drive motor drives the telescopic lens in telescopic motion. Since the drive motor is located at the outside of the camera lens mount, the drive motor requires extra transmission parts in the camera lens mount to drive the telescopic lens to move, which often encounters the following drawbacks.

Since the drive motor is affixed to the outside of the camera lens mount, the structure of the camera lens is asymmetrical, which affects the spatial disposition of the camera lens module consisting of the camera lens mount and the telescopic lens. The telescopic lens may experience problem of run out in the telescopic motion. The extra transmission parts, which drive the telescopic lens to move inside the camera lens mount, add cost and complexity to the camera lens.

SUMMARY OF THE INVENTION

According to a preferred embodiment of the present invention, a motor structure with a built-in lens comprises a lens mount, a motor received in the lens mount, and a lens unit received in the motor. The lens unit has an external thread engaging with an internal thread defined in a rotor of the motor. The lens unit is driven by the motor to telescopically move along an axial direction thereof. A guiding member is arranged on an end of the motor for guiding the telescopic movement of the lens unit. An annular protrusion extends outwardly from the guiding member. The protrusion is sandwiched between the motor and the lens mount for preventing an axial movement of the motor and swing of the rotor. A plurality of legs extend along an axial direction from the guiding member and fit in grooves of the lens unit for guiding the axial movement of the lens unit. By the legs, rotation of the lens unit is prevented. On the other hand, the legs guide the lens unit to move along the axial direction thereof, resulting in stable telescopic axial movement of the lens unit. Therefore the motor can drive the lens unit into stable and accurate movement.

Other advantages and novel features of the present invention will be drawn from the following detailed description of a preferred embodiment of the present invention with attached drawings, in which:

BRIEF DESCRIPTION OF THE DRAWINGS

Many aspects of the present motor structure can be better understood with reference to the following drawings. The components in the drawings are not necessarily drawn to scale, the emphasis instead being placed upon clearly illustrating the principles of the present motor structure. Moreover, in the drawings, like reference numerals designate corresponding parts throughout the several views.

DETAILED DESCRIPTION OF THE INVENTION

Figure 1:
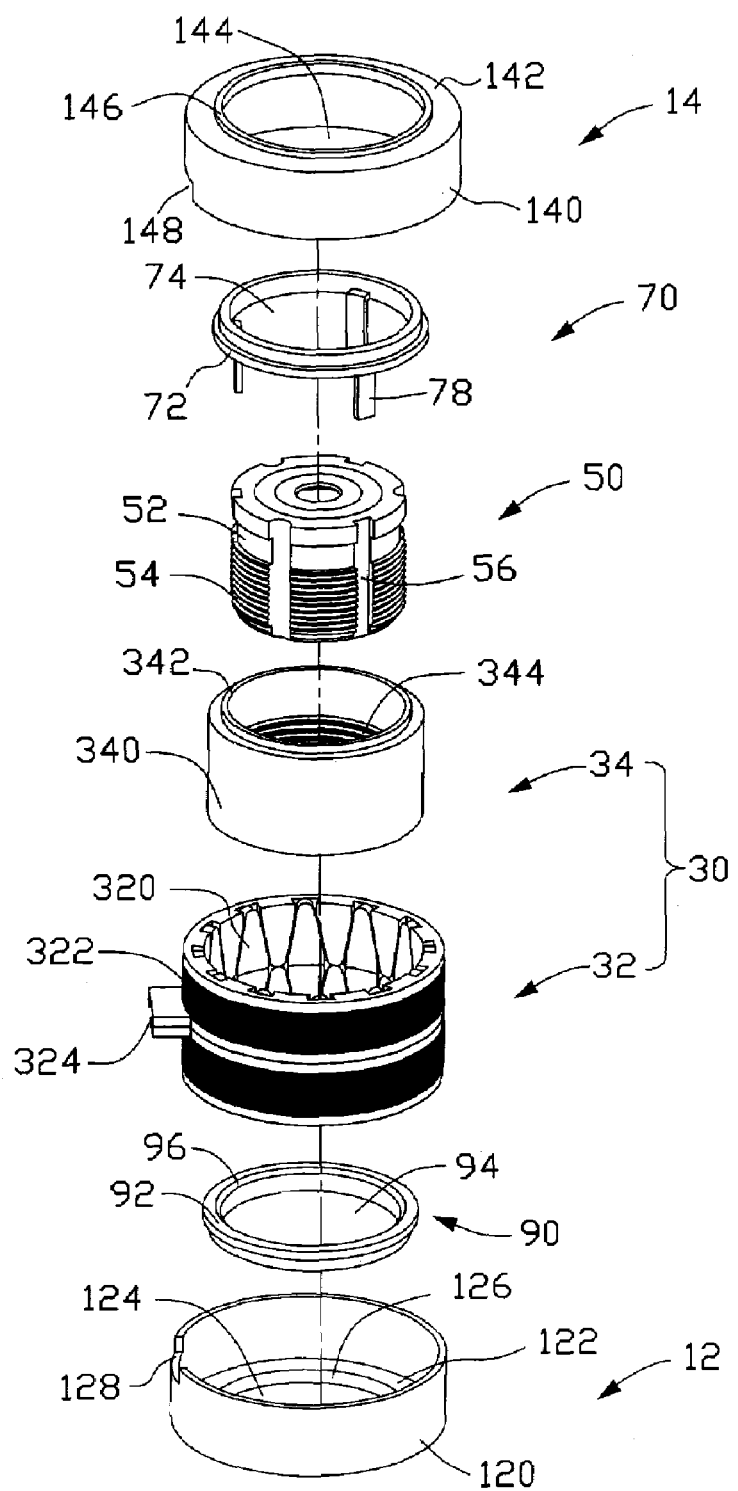
FIG. 1 is an isometric, exploded view of a motor structure with built-in lens in accordance with a preferred embodiment of the present invention.
Figure 2:
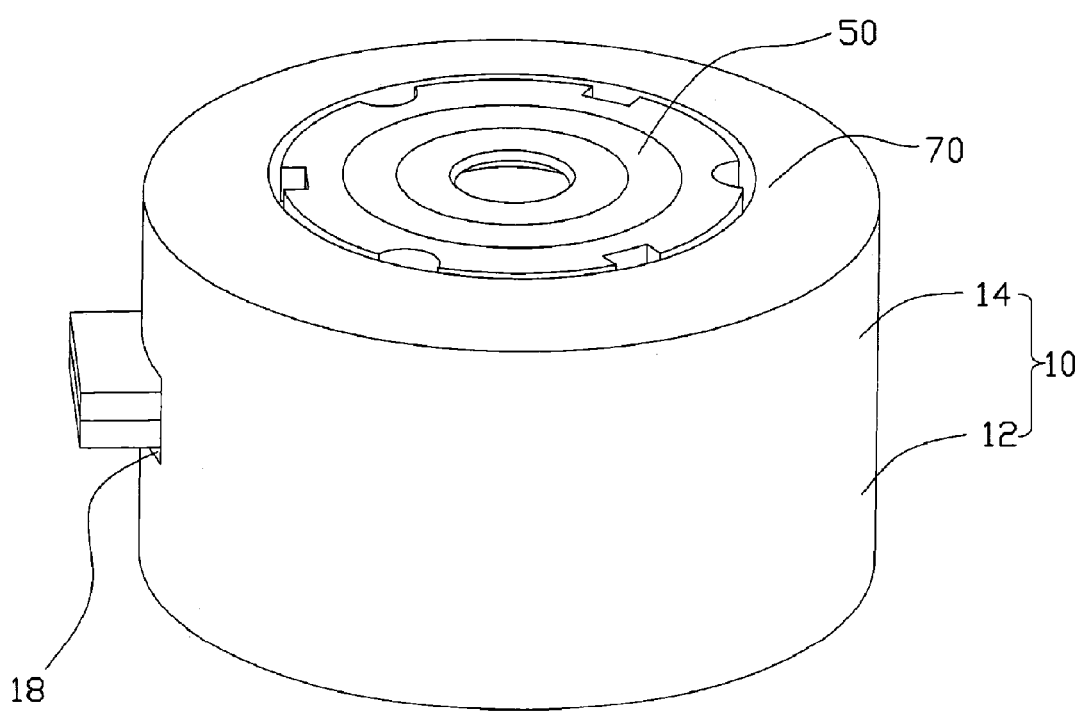
FIG. 2 is an assembled view of FIG. 1.
Figure 3:
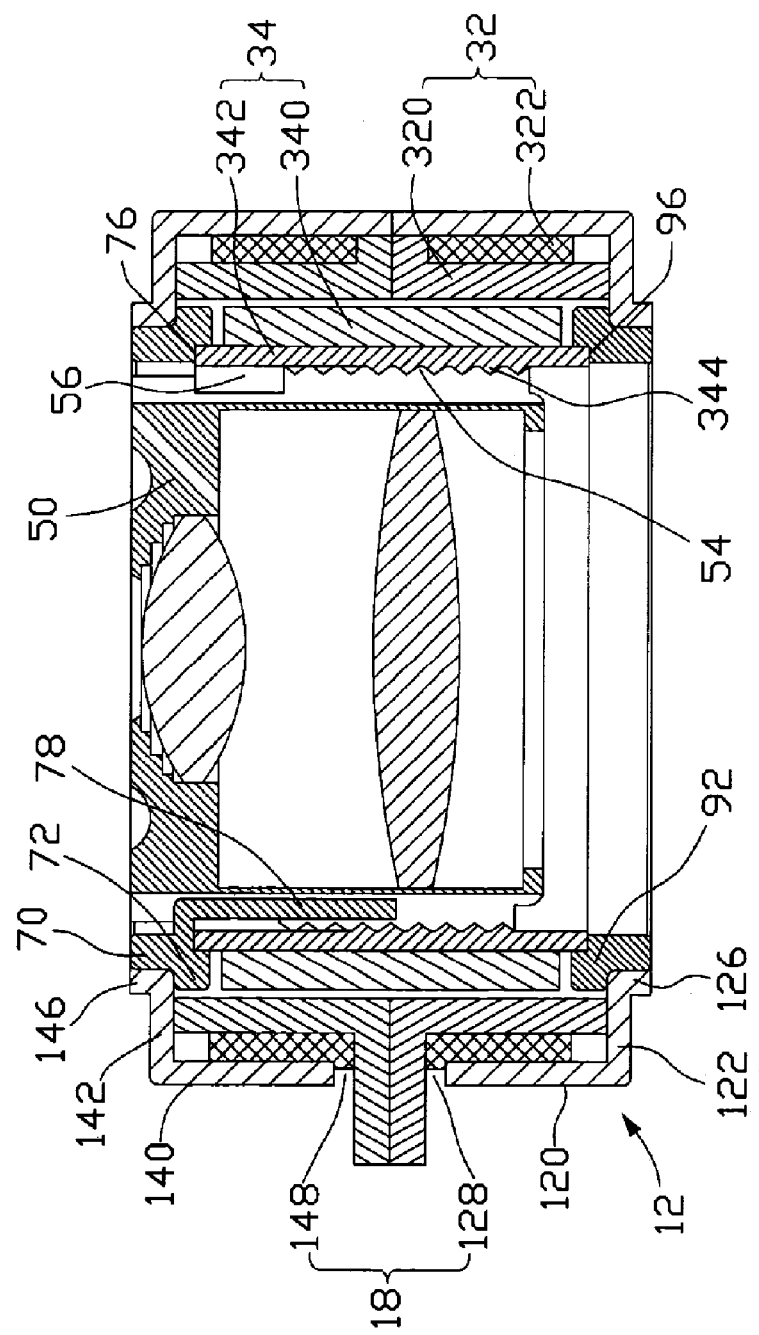
FIG. 3 shows a cross-sectional view of the motor structure of FIG. 2.

Referring to FIGS. 1 through 3, a motor structure with built-in lens according to a preferred embodiment includes a lens mount 10, a motor 30 received in the lens mount 10, a lens unit 50 being drivable by the motor 30, a guiding member 70 and a supporting member 90 arranged at top and bottom end of the motor 30, respectively.

The lens mount 10 includes a bottom cover 12 and a top cover 14 located above and facing the bottom cover 12. Each of the top and bottom covers 14, 12 includes a ring-shaped basewall 142, 122 and a sidewall 140, 120. Each sidewall 140, 120 extends perpendicularly from an outer-periphery of a corresponding basewall 142, 122 towards the other basewall 122, 142. The top and bottom covers 14, 12 cooperatively define a column-shaped space therein when the top and bottom covers 14, 12 are assembled together. The two sidewalls 140, 120 cooperatively form the sidewall of the lens mount 10. An opening 148, 128 is defined in a free end of each of the sidewalls 140, 120, respectively. Together the openings 148, 128 define a passage 18 in the sidewall of the lens mount 10 for extension of wires 324 therethrough to connect the motor 30 with a power source (not shown). Through holes 144, 124 are defined in central portions of the two basewalls 142, 122, respectively. The through holes 144, 124 communicate with the space of the lens mount 10. Flanges 146, 126 extend perpendicularly from inner circumferences of the basewalls 142, 122, respectively. The flange 146 extends upwardly, while the flange 126 extends downwardly.

The motor 30 is received in the space of the lens mount 10. The motor 30 is cylindrical-shaped and hollow. The outer diameter of the motor 30 is approximately the same as the inner diameter of the sidewall of the lens mount 10. The inner diameter of the motor 30 is smaller than the diameter of the through holes 144, 124 of the basewalls 142, 122. The motor 30 includes a stator 32 and a rotor 34 being rotatably received in the stator 32. The stator 32 includes a stator core 320 having a plurality of poles and windings 322 wound around the stator core 320. The windings 322 electrically connect with the wires 324. The rotor 34 includes a cylindrical-shaped shell 342 and a magnet 340 adhered to an outer surface of the shell 342. An internal thread 344 is formed on an inner surface of the shell 342.

The lens unit 50 is linearly movably received in the hollow shell 342 of the rotor 34. An external thread 54 is formed in an outer surface 52 of the lens unit 50 to threadedly engage with the internal thread 344 of the rotor 34. Six grooves 56 are defined in the outer surface 52 of the lens unit 50. The grooves 56 are equidistantly spaced from each other in the outer surface 52 of the lens unit 50, and extend through the lens unit 50 along an axial direction thereof.

The supporting member 90 and the guiding member 70 are ring shaped. A circular hole 94, 74 is defined in a central portion of the supporting (guiding) member 90 (70). The outer diameter of each of the two members 90, 70 is approximately the same as the diameter of each of the through holes 144, 124 of the basewalls 142, 122 of the lens mount 10, and the inner diameter of each of the two members 90, 70 is approximately the same as the outer diameter of the lens unit 50. An annular protrusion 92, 72 extends radially and outwardly from an outer periphery of a positioning end (not labeled) of the supporting (guiding) member 90 (70). An annular step 96, 76 is defined in an inner circumference of the positioning end of the supporting (guiding) member 90 (70). Three legs 78 extend downwardly from the guiding member 70 and equidistantly spaced from each other along a circumferential direction of the guiding member 70. Each leg 78 is elongated. The two members 90, 70 are made of plastic, such as Polyacetal or Polyphylene Sulfide. Also the members 90, 70 can be made of other high abrasion resistant material, such as ceramic, metal etc. The rotor 34 has a bottom end rotatably engaging with the supporting member 90 and a top end rotatably engaging with the guiding member 70. The supporting and guiding members 90, 70 have a low friction.

When assembled, the top cover 14 mounted on the bottom cover 12 to define the space receiving the motor 30 therein. The lens unit 50 is movable received in the hollow motor 30 with the external thread 54 screwing on the internal thread 344 of the rotor 34. The supporting member 90 is sandwiched between the bottom end of the motor 30 and the bottom cover 12, and the guiding member 70 is sandwiched between the top end of the motor 30 and the top cover 14. The supporting member 90 and the guiding member 70 extend into the through hole 144, 124 of the basewall 142, 122 and abut against the inner circumference of the bottom and top covers 14, respectively, whereby the two members 90, 70 are prevented from rotation. The protrusion 92 of the supporting member 90 is sandwiched between the bottom cover 12 and the bottom end of the rotor 34 of the motor 30, whilst the protrusion 72 of the guiding member 70 is sandwiched between the top cover 14 and the top end of the motor 30, whereby an axial movement of the two members 90, 70 is prevented. The bottom and top ends of the rotor 34 are received in the steps 96, 76 of the supporting member 90 and guiding member 70, respectively. Each leg of the guiding member 70 extends into a corresponding groove 56 of the lens unit 50 to guide the movement of the lens unit 50.

Figure 4:
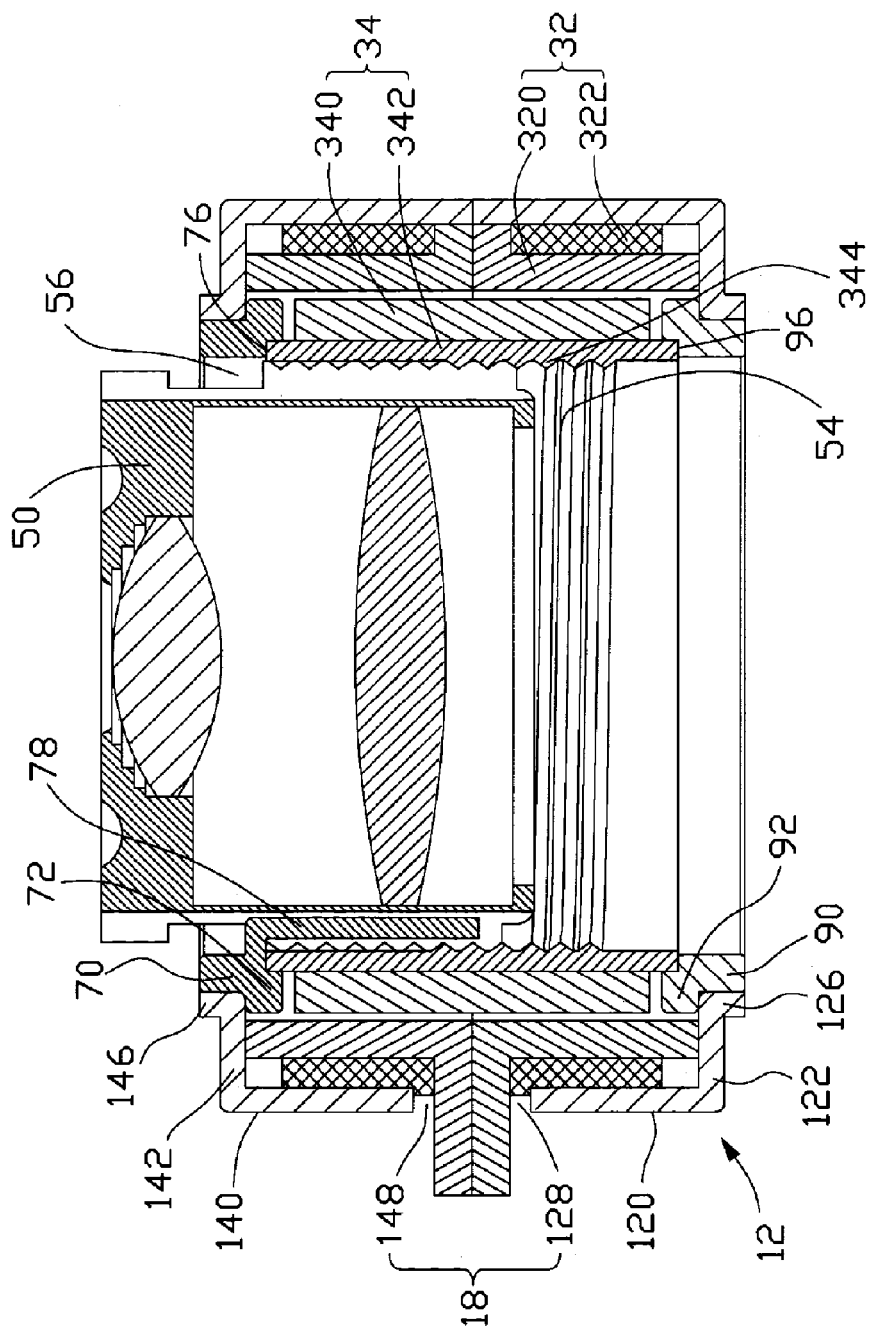
FIG. 4 is similar to FIG. 3, but showing a lens unit of the motor structure in telescopic motion.

Referring to FIG. 4, during operation, a current is applied to the windings 322 of the motor 30 through the wires 324. The rotor 34 is driven to rotate by the interaction of the alternating magnetic field established by the stator 32 and the magnetic field of the rotor 34. The rotation of the rotor 34 then turns to the axial telescopic movement of the lens unit 50 through the action between the internal thread 344 of the rotor 34 and the external thread 54 of the lens unit 50. Therefore the motor 30 acts as a stepper motor to drive the lens unit 50 into telescopic movement along the axial direction of the lens unit 50. For the motor 30 is directly built inside the cylindrical-shaped lens mount 10, a symmetrical ring shape structure is formed to improve the flexibility of the spatial disposition of the motor structure. The motor 30 delivers omnidirectional drive to eliminate run out occurring during the telescopic motion of the telescopic lens unit 50. The guiding member 70 and the supporting member 90 abut the top and bottom ends of the rotor 34 to limit the axial movement of the rotor 34. The steps 96, 76 of the two members 90, 70 abut the rotor 34 to avoid swing of the rotor 34. Thus, a stable and precise rotation of the rotor 34 can be obtained. The legs 78 of the supporting member 90 are received in the grooves 56 of the lens unit 50, thereby avoiding rotation of the lens unit 50 during the telescopic movement thereof. On the other hand, the legs 78 guide the lens unit 50 to move linearly along the axial direction thereof, resulting in stable telescopic axial movement of the lens unit 50. Thus, the motor 30 can drive the lens unit 50 into stable and accurate movement.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A motor structure with built-in lens comprising:
   a lens mount;
   a motor received in the lens mount;
   a lens unit received in the lens mount and driven by the motor to telescopically move along an axial thereof; and
   a guiding member arranged on an end of the motor for preventing an axial movement of the motor, the guiding member comprising at least a leg extending along an axial direction thereof into the lens unit for guiding the axial movement of the lens unit;
   wherein a protrusion extends radially and outwardly from an outer periphery of the guiding member, the protrusion being sandwiched between the motor and lens mount to prevent the axial movement of the motor; and
   wherein a through hole is defined in the lens mount for extension of the guiding member therethrough, a flange extending upwardly from a circumference of the through hole along an axial direction of the lens mount for radially positioning the guiding member, the guiding member abutting against an inner surface of the flange.

2. The motor structure as claimed in claim 1, wherein the at least a leg is elongated.

3. The motor structure as claimed in claim 1, wherein a groove is defined in an outer surface of the lens unit and receives the at least a leg therein.

4. The motor structure as claimed in claim 1, wherein the guiding member is made one of the following materials: plastic, ceramic and metal.

5. The motor structure as claimed in claim 4, wherein the plastic is selected from one of the following materials: Polyacetal and Polyphenylene Sulfide.

6. The motor structure as claimed in claim 1, further comprising a supporting member located at another end of the motor, the supporting member configures an annular protrusion sandwiched between the lens mount and the motor.

7. The motor structure as claimed in claim 1, wherein the motor is hollow and receives the lens mount therein, the motor comprises a cylinder-shaped stator and a rotor received in the stator, an internal thread is formed on an inner surface of the rotor, an external thread screwed on the internal thread is formed on an outer surface of the lens unit.

8. The motor structure as claimed in claim 1, wherein the lens mount comprises a bottom cover and a top cover mounted on and faced the bottom cover, cooperatively the top and bottom cover define a space receiving the motor and the lens unit therein.

9. The motor structure as claimed in claim 1, wherein the leg extends along an axial direction of the guiding member and is elongated.

10. The motor structure as claimed in claim 1, wherein a protrusion extends radially and outwardly from an outer periphery of the positioning member to form the step-shaped outer surface of the guiding member.

11. The motor structure as claimed in claim 1, further comprising a second basewall at another end of opposite to the end the lens mount, a supporting member being located between the second basewall and the rotor.

12. The motor structure as claimed in claim 11, wherein the supporting member configures a step-shaped outer surface.

13. A motor structure with a built-in lens comprising:
    a lens mount having a top cover and a bottom cover connecting together to define a chamber therein, the top cover defining a through hole;

a motor mounted in the chamber, having a stator and rotor rotatably mounted in the stator, the rotor having an internal thread;

a supporting member mounted between the bottom cover and the rotor whereby the rotor is rotatably supported by the supporting member;

a guiding member mounted between the top cover and the rotor whereby the rotor rotatably engages with the guiding member, the guiding member having a portion located in the through hole; and a lens unit received in the rotor and having external thread engaging with the internal thread, the guiding member having a plurality of elongate legs extending downwardly to fit in grooves defined in the lens unit;

wherein when the rotor rotates, the lens unit moves linearly through the through hole of the top cover surrounded by the guiding member.

14. The motor structure as claimed in claim 13, wherein the supporting and guiding members are made of material having a low friction and a high abrasion resistance.

15. The motor structure as claimed in claim 14, wherein the material is selected from one of following materials: Polyacetal and Polyphenylene Sulfide.

* * * * *